2,954,382

Patented Sept. 27, 1960

2,954,382

PREPARATION OF HEXAHYDROBENZOQUINOLIZINE COMPOUNDS AND INTERMEDIATES

John Mervyn Osbond, Welwyn Garden City, Hertfordshire, England, assignor to Hoffmann-La Roche Inc., Nutley, N.J., a corporation of New Jersey No Drawing. Filed July 28, 1958, Ser. No. 751,183

Claims priority, application Great Britain Aug. 6, 1957

7 Claims. (Cl. 260—289)

This invention relates to novel chemical compounds, novel processes for the preparation thereof, and novel processes for conversion of said novel compounds to known compounds having known utility. More particularly, the invention relates to novel substituted tetrahydrobenzo[a]quinolizine compounds; to their preparation; and to their conversion to known substituted hexahydrobenzo[a]quinolizine compounds.

In one of its broad aspects, the invention provides a novel process of preparing the known compounds described in U.S. Patent 2,843,591, which known compounds can be represented by the following formula (I)

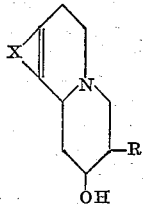

wherein the symbols X and R, respectively, have the same meanings as in the above identified patent, i.e. wherein X represents a divalent radical selected from the group consisting of butadien-1,4-ylene, dihydroxybutadien-1,4-ylene, di(lower alkoxy)-butadien-1,4-ylene, (lower alkylenedioxy)-butadien-1,4-ylene and 1,4-butylene radicals, and R represents a member selected from the group consisting of lower alkyl, lower alkenyl, lower acyclic alkoxyalkyl, lower cyclic alkoxyalkyl and lower aralkyl radicals. This process comprises catalytically hydrogenating in the presence of a palladium hydrogenation catalyst a novel compound provided by the present invention, i.e. a compound selected from the group consisting of those having the general formula (II)

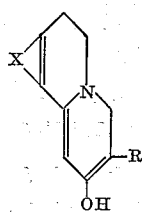

wherein X and R have the same meaning defined above, and acid addition salts thereof.

In another of its broad aspects, the invention provides a second novel process of making the known compounds of Formula I above. This second process comprises reacting a novel compound, provided by the present invention, which can be represented by the general formula (III)

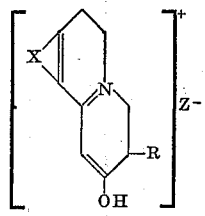

wherein X and R, respectively, have the same meaning indicated above, and Z represents a mineral acid anion, e.g. Cl⁻, Br⁻, I⁻, ½(SO₄)⁼, etc., with an alkali metal borohydride, thereby producing a compound which can be represented by the general formula (IV)

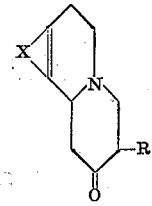

wherein X and R, respectively, have the same meaning indicated above; and catalytically hydrogenating the latter in the presence of a platinum hydrogenation catalyst.

In still another of its aspects, the invention provides a further novel process of making the known compounds of Formula I above. This third process comprises reacting a novel compound of Formula II above with an alkali metal aluminum hydride, thereby producing a compound of the general Formula IV above; and catalytically hydrogenating the latter in the presence of a platinum hydrogenation catalyst.

The invention can be readily comprehended from the following flow sheet, illustrating a specific embodiment thereof, wherein the symbol Z has the same meaning indicated above, and the symbol M represents an alkali metal.

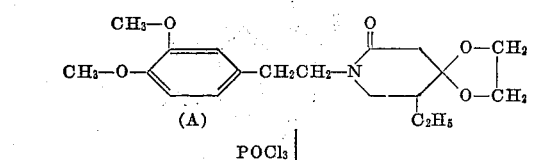

(A)

POCl₃ ↓

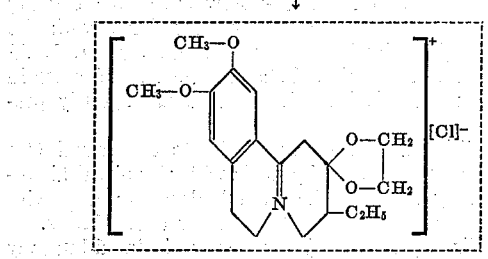

(B)

↓ hydrolysis

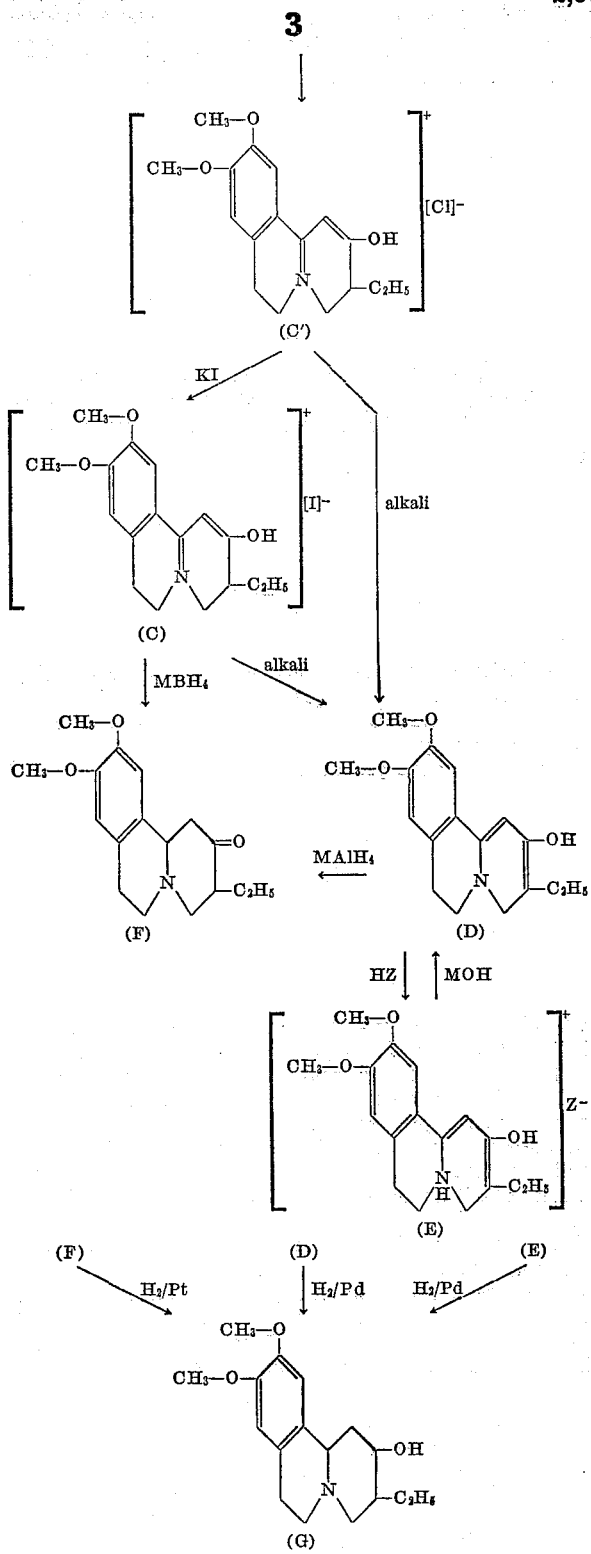

With reference to the above flow sheet, the starting material (A) can be prepared in accordance with the method described by Ban, Pharm. Bull. (Japan), 3, 53 (1955). Other 5-substituted starting materials for use in the processes of this invention can be analogously prepared.

The cyclization of compound (A) to compound (B) is conveniently effected by a Bischler-Napieralski reaction, i.e. by heating (A) in anhydrous toluene with phosphorus oxychloride at 100° C. for a few hours.

The cyclized product (B) need not be isolated but may be hydrolyzed in situ, for example by warming with a mineral acid, e.g. dilute aqueous hydrochloric acid.

The conversion of the quinolizinium salts (C') and (C) to the free base (D) can be effected by treatment with alkali, preferably dilute aqueous sodium hydroxide.

The free base (D) readily forms acid addition salts (E) with acids, e.g. mineral acids such as HZ, wherein Z has the same meaning previously indicated.

The quinolizinium chloride (C') can be converted to the corresponding iodide (C) by treatment with potassium iodide. Other salts can be obtained from the chloride and iodide by cationic exchange using a resin.

Conversion of the iodide (C) to the ketone (F) is conveniently effected by mixing with an alkali metal borohydride, preferably potassium borohydride, in a lower alkanol.

The same ketone (F) is obtained by treatment of the base (D) with an alkali metal aluminum hydride, preferably with lithium aluminum hydride in an inert solvent; and refluxing the mixture obtained.

The ketone (F) is conveniently converted to the hexahydrobenzo[a]quinolizine end product (G) by catalytic reduction in the presence of a platinum hydrogenation catalyst.

On the other hand, when converting the hydroxylic compound (D) or an acid addition salt thereof (E) to the end product (G), it is convenient to employ catalytic reduction in the presence of a palladium hydrogenation catalyst.

When starting from a compound (A) containing the n-butyl or isobutyl substituent in place of the ethyl radical shown in the above flow sheet, it is convenient to follow the route indicated by the formulae (D)(G), (D)(E)(G) or (D)(F)(G) in order to obtain in good yield and the end product (G), wherein the ethyl radical is replaced by n-butyl or isobutyl.

The invention is further disclosed in the following examples, which are illustrative but not limitative thereof.

*Example 1*

Crystalline 1 - [2'-(3'',4''-dimethoxy-phenyl)-ethyl]-2-oxo-4-ethylenedioxy-5-ethyl-piperidine of melting point 65°–67° C. (7.9 g.), dry toluene (25 ml.) and phosphorus oxychloride (20 ml.) were heated on a steam bath for 2.25 hours. The solution was evaporated to dryness under reduced pressure and the residue treated with dilute hydrochloric acid (30 ml.; 2 N) and warmed for a few minutes at 50°–60° C. The solution was filtered, cooled and treated with an aqueous solution of potassium iodide. The oily precipitated iodide, 3-ethyl-2 - hydroxy- 9,10-dimethoxy-3,4,6,7-tetrahydro-benzo[a]quinolizinium iodide, was extracted with chloroform. On removal of the chloroform, the iodide was crystallized from a mixture of methanol and diethyl ether as yellow prisms (4.85 g.); M.P. 171°–172.5° C. (d.), 240°–241° C. (d.).

*Example 2*

The iodide product of Example 1 (2.3 g.) in methanol (100 ml.) was treated with potassium borohydride (0.2 g.) in two portions at ca. 20° C. The solution was left at this temperature for 12 hours and the methanol then removed under reduced pressure. The residue was extracted with aqueous sodium carbonate and ether. After drying, the ether extract was concentrated, the 2-oxo - 3-ethyl-9,10-dimethoxy-1,2,3,4,6,7-hexahydrobenzo[a]quinolizine separating as colorless prisms; M.P. 111°–112.5° C.

Its hydrochloride melted at 201.5°–202.5° C. and its hydrobromide melted at 216.5°–217.5° C.

*Example 3*

The base product of Example 2 was dissolved in methanol and hydrogenated in the presence of a reduced platinum oxide catalyst and gave 2-hydroxy-3-ethyl-9,10-dimethoxy - 1,2,3,4,6,7 - hexahydrobenzo[a]quinolizine of melting point 155°–157° C.

Example 4

The iodide product of Example 1 was dissolved in methanol and treated with aqueous sodium hydroxide. The resulting 2-hydroxy-3-ethyl-9,10-dimethoxy-6,7-dihydro-4H-benzo[a]quinolizine was extracted with benzene. On evaporation of the extract, the base was obtained as a yellow solid which crystallized from ethyl acetate as yellow prisms of melting point 168–170° C. On treatment with hydrochloric acid it gave a hydrochloride, of melting point 222°–224° C. (d.), when crystallized from a mixture of methanol and diethyl ether. With hydriodic acid it gave yellow prisms of a hydroiodide of melting poitn 215°–217° C.

Example 5

The base product of Example 4 was dissolved in methanol (15 ml.) and catalytically reduced with palladized charcoal at ca. 70° C. The uptake of hydrogen was fairly rapid and amounted to 2 mols. After filtration, the methanol was removed under reduced pressure and the resulting 2-hydroxy-3-ethyl - 9,10 - dimethoxy-1,2,3,4,6,7-hexahydrobenzo[a]quinolizine crystallized from a mixture of ethyl acetate and petroleum ether as needles of melting point 155°–157° C. With hydrobromic acid it gave a hydrobromide of melting point 231.5°–233° C.

Example 6

Crystalline 1-[2'-(3",4"-dimethoxy-phenyl)-ethyl] - 2-oxo-4-ethylenedioxy-5-ethyl-piperidine of melting point 65°–67° C. (7.9 g.), dry toluene (25 ml.) and phosphorus oxychloride (20 ml.) were heated on a steam bath for 2.25 hours. The mixture was filtered and evaporated to dryness under reduced pressure and the residue treated with dilute hydrochloric acid (2 N; 30 ml.) and warmed for a few minutes at 50°–60° C. The filtered cooled solution was treated with aqueous sodium hydroxide. The basic material was then extracted with benzene and the benzene extract evaporated to yield 2-hydroxy-3-ethyl-9,10 - dimethoxy-6,7-dihydro - 4H - benzo[a]quinolizine, which was crystallized from ethyl acetate as yellow prisms of melting point 169°–171.5° C. Its hydrochloride melted at 222°–224° C. (d.) when crystallized from a mixture of methanol and diethyl ether as pale yellow prisms. Its hydroiodide was obtained as yellow prisms of melting point 215°–217° C.

Example 7

The base product of Example 6 was dissolved in methanol (15 ml.) and catalytically reduced with palladized charcoal at ca. 20° C. The uptake of hydrogen was fairly rapid and amounted to 2 mols. After filtration, the methanol was removed under reduced pressure and the resulting 2-hydroxy-3-ethyl-9,10-dimethoxy-1,2,3,4,6,7-hexahydrozenzo[a]quinolizine crystallized from a mixture of ethyl acetate and petroleum ether as needles of melting point 155°–157° C. With hydrobromic acid it gave a hydrobromide of melting point 231.5°–233° C.

Example 8

1-[2'-(3",4"-dimethoxy-phenyl)-ethyl]-2-oxo - 4 - ethylenedioxy-5-n-butyl-piperidine (4.37 g.) was dissolved in toluene (20 ml.) and phosphorus oxychloride (10 ml.) and heated on a boiling water bath for 3 hours. The toluene and phosphorus oxychloride were then removed under vacuum and the residue dissolved in hot dilute hydrochloric acid (2 N). The aqueous solution was filtered, made alkaline with 2 N sodium hydroxide solution and extracted with benzene. Removal of the benzene gave 2-hydroxy-3-n-butyl-9,10-dimethoxy-6,7-dihydro-4H-benzo[a]quinolizine as a yellow base which separated from ethyl acetate as needles (15 g.) M.P. 180°–182° C. Hydrochloride: [M.P. 187°–190° C. (d.)]; hydrobromide: [M.P. 218°–219° C. (d.)].

Example 9

The base product of Example 8 (1 g.) was added to a suspension of lithium aluminum hydride (0.2 g.) in dry tetrahydro-furan (30 ml.) and heated under reflux for 3 hours. The yellow brown solution was treated with ethyl acetate (1 ml.), ether (20 ml.) and water. The insoluble material was filtered, and the ether washed with water and dried. The ether was removed and the residue dissolved up in dilute hydrochloric acid. From the aqueous solution the sparingly soluble hydrochloride of 2-oxo-3-n-butyl-9,10-dimethoxy - 1,2,3,4,6,7 - hexahydro - 11b - H-benzo[a]quinolizine (0.1 g.) separated; M.P. 198°–199° C.

Example 10

The ketone product of Example 9 was hydrogenated in methanol in the presence of platinum oxide catalyst and gave 2 - hydroxy - 3 - n-butyl-9,10-dimethoxy-1,2,3,4,6,7-hexahydro-11b-H-benzo[a]quinolizine of melting point 231° C.

Example 11

1-[2'-(3",4" - dimethoxy-phenyl)-ethyl]-2-oxo-4-ethylenedioxy-5-isobutyl-piperidine (5.0 g.) was dissolved in toluene (20 ml.) and phosphorus oxychloride (10 ml.) and heated on a boiling water bath for 3 hours. The toluene and phosphorus oxychloride were then removed under vacuum and the residue dissolved in hot dilute hydrochloric acid (2 N). The aqueous solution was filtered, made alkaline with 2 N sodium hydroxide solution and extracted with benzene. Removal of the benzene gave 2 - hydroxy-3-isobutyl-9,10-dimethoxy-6,7-dihydro-4H-benzo[a]quinolizine, which separated from a mixture of ethyl acetate and petroleum ether (boiling range 40°–60° C.) as yellow prisms of melting point 154°–157° C. (1.8 g.). Hydrochloride: M.P. 222°–223° C.; hydrobromide: M.P. 202–204° C.

I claim:

1. A compound selected from the group consisting of bases represented by the general formula

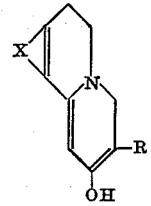

wherein:

X represents a divalent radical selected from the group consisting of butadien-1,4-ylene, dihydroxy-butadien-1,4-ylene, di(lower alkoxy)-butadien-1,4-ylene, (lower alkylenedioxy)-butadien - 1,4 - ylene and 1,4-butylene radicals, and R represents a member selected from the group consisting of lower alkyl, lower alkenyl, lower alkoxy-lower alkyl, tetrahydrofurfuryl and benzyl radicals, and acid addition salts thereof with mineral acids.

2. 2-hydroxy - 3-ethyl - 9,10 - dimethoxy-6,7-dihydro-4H-benzo[a]quinolizine.

3. 2-hydroxy - 3 - n-butyl-9,10-dimethoxy-6,7-dihydro-4H-benzo[a]quinolizine.

4. 2-hydroxy - 3 - isobutyl-9,10-dimethoxy-6,7-dihydro-4H-benzo[a]quinolizine.

5. A compound represented by the general formula

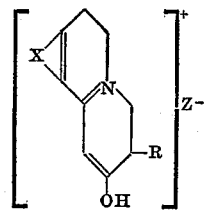

wherein:

X represents a divalent radical selected from the group consisting of butadien-1,4-ylene, dihydroxy-butadien-1,4-ylene, di(lower alkoxy)-butadien-1,4-ylene, (lower alkylenedioxy)-butadien-1,4-ylene and 1,4-butylene radicals, R represents a member selected from the group consisting of lower alkyl, lower alkenyl, lower alkoxy-lower alkyl, tetrahydrofurfuryl and benzyl radicals, and Z represents a mineral acid anion.

6. 2-hydroxy-3-ethyl-9,10-dimethoxy-3,4,6,7-tetrahydrobenzo[a]quinolizinium halide.

7. 2-hydroxy-3-isobutyl-9,10-dimethoxy-3,4,6,7-tetrahydrobenzo[a]quinolizinium halide.

References Cited in the file of this patent

UNITED STATES PATENTS

| | | |
|---|---|---|
| 2,830,992 | Brossi et al. | Apr. 15, 1958 |
| 2,830,993 | Brossi et al. | Apr. 15, 1958 |
| 2,843,591 | Brossi et al. | July 15, 1958 |

FOREIGN PATENTS

| | | |
|---|---|---|
| 789,789 | Great Britain | Jan. 29, 1958 |

OTHER REFERENCES

Battersby et al.: J. Chem. Soc. (London), 1953, pp. 2463–2467.